United States Patent
Kim et al.

(10) Patent No.: US 12,321,587 B2
(45) Date of Patent: Jun. 3, 2025

(54) MOBILE TERMINAL INCLUDING FLEXIBLE DISPLAY UNIT HAVING FIRST AND SECOND DISPLAY

(71) Applicant: LG ELECTRONICS INC., Seoul (KR)

(72) Inventors: Changmok Kim, Seoul (KR); Junho Seo, Seoul (KR); Jinhee Lee, Seoul (KR); Eunkyung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/753,330

(22) PCT Filed: Sep. 5, 2019

(86) PCT No.: PCT/KR2019/011455
§ 371 (c)(1),
(2) Date: Feb. 28, 2022

(87) PCT Pub. No.: WO2021/045264
PCT Pub. Date: Mar. 11, 2021

(65) Prior Publication Data
US 2022/0317847 A1    Oct. 6, 2022

(51) Int. Cl.
*G06F 3/0488* (2022.01)
*G06F 3/0486* (2013.01)
*H04M 1/72* (2021.01)

(52) U.S. Cl.
CPC .......... *G06F 3/0488* (2013.01); *G06F 3/0486* (2013.01); *H04M 1/72* (2013.01); *H04M 2250/12* (2013.01)

(58) Field of Classification Search
CPC ............... H04M 2250/12; H04M 1/72; H04M 1/72454; H04M 1/0268; H04M 1/0235;
(Continued)

(56) References Cited

U.S. PATENT DOCUMENTS

2010/0001967 A1* 1/2010 Yoo ...................... G06F 3/04817
715/833
2013/0065614 A1* 3/2013 Jung ........................ G06F 3/044
455/418
(Continued)

FOREIGN PATENT DOCUMENTS

KR     1020100021924      2/2010
KR     1020130029307      3/2013
(Continued)

OTHER PUBLICATIONS

PCT International Application No. PCT/KR2019/011455, International Search Report dated Jun. 5, 2020, 10 pages.
(Continued)

*Primary Examiner* — Stephen G Sherman
(74) *Attorney, Agent, or Firm* — LEE, HONG, DEGERMAN, KANG & WAIMEY

(57) ABSTRACT

A mobile terminal comprises: a body; a first display which is located on one surface of the body, detects a touch input, and outputs a screen; a second display which is located on the other surface of the body, detects a touch input, and outputs a screen; a gyro sensor for detecting movement of the body; and a control unit for controlling the first display and the second display on the basis of the touch input, wherein the control unit outputs a first screen on the first display, when detecting a first touch input on the first display, removes the first screen from the first display, and, when the gyro sensor detects that the locations of the one surface and the other surface of the body are reversed, outputs the first screen on the second display, wherein the mobile terminal may easily implement multitasking by using displays located on both surfaces thereof.

10 Claims, 14 Drawing Sheets

(58) Field of Classification Search
CPC .. G06F 3/0488; G06F 3/0486; G06F 3/04817;
G06F 3/04842; G06F 3/04883; G06F
1/1624; G06F 1/1643; G06F 1/1694;
G06F 1/1652; G06F 2203/04808
See application file for complete search history.

(56) References Cited

U.S. PATENT DOCUMENTS

| | | | |
|---|---|---|---|
| 2013/0249873 A1* | 9/2013 | Zhang | G09G 3/20 |
| | | | 345/204 |
| 2018/0095502 A1 | 4/2018 | Yamazaki et al. | |

FOREIGN PATENT DOCUMENTS

| | | |
|---|---|---|
| KR | 10-2014-0046346 | 4/2014 |
| KR | 10-1467881 | 12/2014 |
| KR | 1020160141477 | 12/2016 |
| KR | 10-2017-0006055 | 1/2017 |
| KR | 1020170006055 A * | 1/2017 |
| KR | 10-2018-0115658 | 10/2018 |

OTHER PUBLICATIONS

Korean Intellectual Property Office Application No. 10-2022-7006924, Office Action dated Jun. 24, 2024, 5 pages.

* cited by examiner (a)

(b)

(a)

(b)

(a)    (b)

(a)

(b)

(a)

(b)

(a)

(b)

(a)

(b)

(a)

(b)

(a)              (b)

MOBILE TERMINAL INCLUDING FLEXIBLE DISPLAY UNIT HAVING FIRST AND SECOND DISPLAY

CROSS-REFERENCE TO RELATED APPLICATIONS

This application is the National Stage filing under 35 U.S.C. 371 of International Application No. PCT/KR2019/011455, filed on Sep. 5, 2019, the contents of which is hereby incorporated by reference herein in its entirety.

TECHNICAL FIELD

The present disclosure relates to a mobile terminal having a display unit including screens on a front surface and a rear surface thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

Recently, a flexible display, which has sufficient elasticity, and thus, be able to be deformed largely, has been developed. A size of the mobile terminal may be varied using a deforming property of the flexible display. Preferably, the mobile terminal having a flexible structure should be designed to be stably changed in structure, and a support structure of the flexible display unit becomes problematic.

DISCLOSURE

Technical Problem

The present disclosure is to provide a mobile terminal including a display unit including screens on a front surface and a rear surface thereof that may utilize the two screens.

Technical Solutions

Provided is a mobile terminal including a body, a first display positioned on one surface of the body, wherein the first display senses a touch input and outputs a screen (screen image), a second display positioned on the other surface of the body, wherein the second display senses a touch input and outputs a screen (screen image), a gyro sensor for sensing a movement of the body, and a controller that controls the first display and the second display based on the touch inputs, wherein the controller outputs a first screen (first screen image) on the first display, removes the first screen from the first display when a first touch input is sensed on the first display, and outputs the first screen on the second display when the gyro sensor senses that positions of said one surface and the other surface of the body are reversed.

The controller may deactivate the first display when outputting the first screen on the second display.

The second display may not sense the touch input on the second display in a touch locked state, and sense the touch input on the second display in a touch input state, and the controller may not output a virtual key 14 on the second display in the touch locked state, and switch a state of the second display to the touch input state and output the virtual key 14 on the second display when an unlocking input is sensed.

The controller may, when there are a plurality of first screens removed from the first display, output the plurality of first screens to overlap each other on the second display.

When there are a plurality of first screens removed from the first display, icons respectively corresponding to the plurality of first screens may be output on the second display.

The controller may output the first screen again on the first display when a second touch input is sensed on the second display after removing the first screen from the first display.

The controller may output the first screen again on the first display when a third touch input is sensed on the first display after removing the first screen from the first display.

The controller may output the first screen on a floating window superimposed on an existing screen of the first display.

The mobile terminal may further include a flexible display unit having one side positioned on said one surface of the body and the other side positioned on the other surface of the body, wherein the flexible display unit surrounds one side surface of the body, and the first display and the second display may be positioned on the flexible display unit.

The first touch input may include a multi-touch-and-drag input where three touch points are dragged in a direction toward said one side surface of the body surrounded by the flexible display unit.

The body may expand in a direction of said one side surface thereof, and, in the flexible display unit, the first display may be expanded and the second display may be reduced when the body is expanded.

The controller may output an icon corresponding to the first screen on an expanded portion when the first display is expanded.

Advantageous Effects

According to one embodiment of the present disclosure, it is possible to provide a mobile terminal and a method for control the same capable of screen expansion.

More specifically, the mobile terminal may utilize the screens located on the front and rear surfaces in an associated manner, thereby facilitating multitasking.

Further scope of applicability of the present disclosure will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
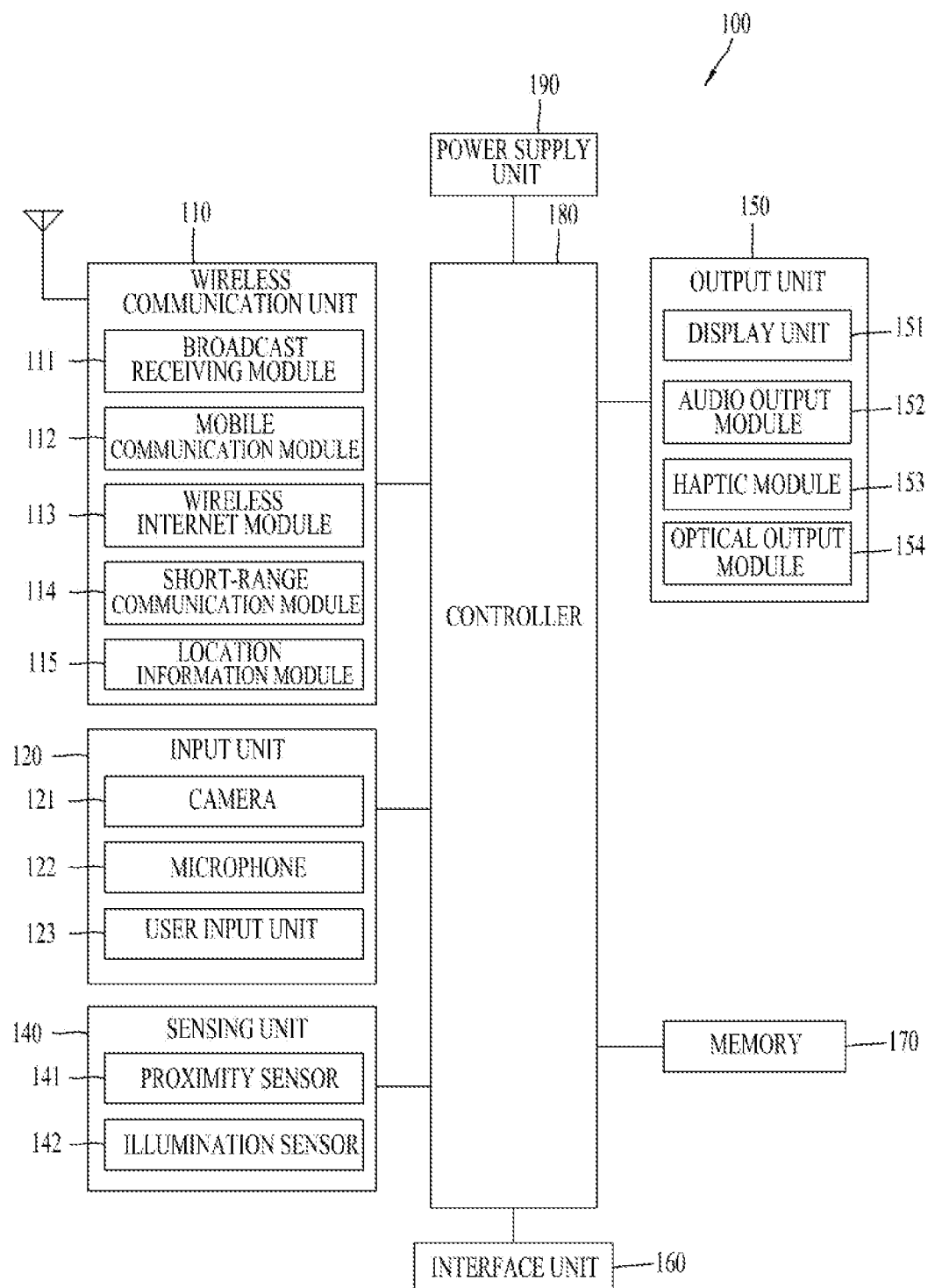
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components in FIG. 1 is not a requirement, and that greater or fewer components may alternatively be implemented than the components listed above.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed as a user's control command.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
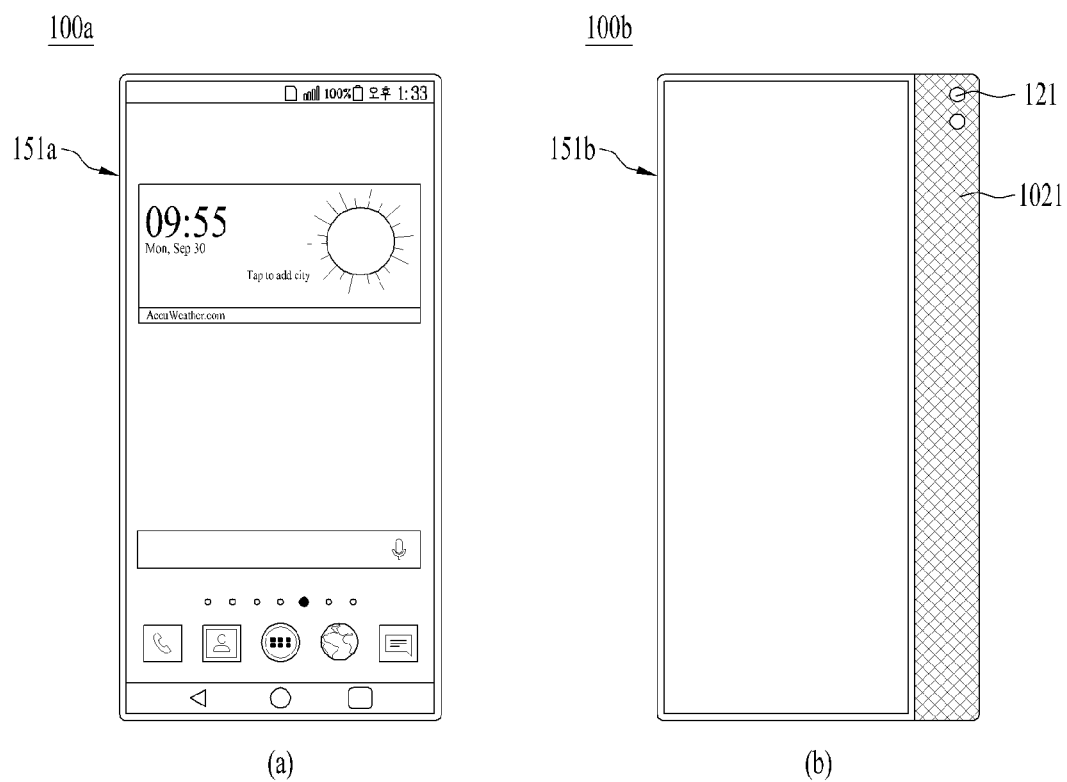
FIG. 2 shows a front view and a rear view of a mobile terminal in accordance with the present disclosure.

FIG. 2 shows a front view and a rear view of the mobile terminal 100 in accordance with the present disclosure. The mobile terminal 100 of the present disclosure may have displays on both one surface and the other surface of a body thereof, so that screens may be respectively output on both of the displays. A size of the first display 151a located on one surface of the body and a size of the second display 151b located on the other surface of the body may be the same, or the size of the first display 151a may be greater than that of the second display 151b as shown in FIG. 2. However, for arrangement of parts, such as the camera, the audio output module, and the like, exposed to the outside of the body of the mobile terminal 100, the size of the second display 151b may be smaller than that of the other surface of the body as shown in (b) in FIG. 2, and the remaining region 1021 may be used to place the camera 121, the user input unit, the finger scan sensor, and the like.

The screens are output on both one surface and the other surface of the body, and the front surface and the other surface are able to be changed depending on an arrangement direction. However, for convenience of description, a surface on which a larger display is positioned as shown in (a) in FIG. 2 will be referred to as the front surface, and a surface on which a smaller display is positioned as shown in (b) in FIG. 2 will be referred to as the rear surface. A first touch sensor for sensing a touch input on the first display 151a and a second touch sensor for sensing a touch input on the second display 151b may be disposed.

It is also possible to place an independent display unit on each of one surface and the other surface of the body, but both of the first display 151a on the front surface and the second display 151b on the rear surface may be implemented with one display unit 151 using the flexible display unit that may be bent. The flexible display unit 151 may be bent to cover one surface of the body, so that one side of the flexible display unit 151 may be located on one surface of the body and the other side of the flexible display unit 151 may be located on the other surface of the body. The portion located on one surface of the body may become the first display 151a and the portion located on the other surface may become the second display 151b.

When the flexible display unit 151 is used as such, the body may be changed. The body may include a first frame located on one surface thereof and a second frame located on the other surface thereof. When the first frame and the second frame are coupled to each other in a hinge scheme, the body may be changed by being unfolded or folded. In this regard, because a shape of the flexible display unit 151 changes, a portion located on one side surface of the body may be unfolded.

Alternatively, a first frame 101 and a second frame 102 slidable with respect to the first frame 101 may be included. When the second frame 102 slides with respect to the first frame 101 in a direction of one side surface of the body (a first direction), the body may expand in the first direction. In this regard, the other side of the flexible display unit 151 may be coupled to the body to be slidable with respect to the second frame 102, so that areas of the first display 151*a* and the second display 151*b* may change.

That is, when the second frame 102 moves in the first direction, an area of the first display 151*a* increases and an area of the second display 151*b* decreases. When the second frame 102 moves in a direction opposite to the first direction, the area of the first display 151*a* decreases and the area of the second display 151*b* increases. Hereinafter, referring to FIGS. 3 to 6, the mobile terminal 100 including the second frame 102 that slides with respect to the first frame 101 will be described in more detail.

Figure 3:
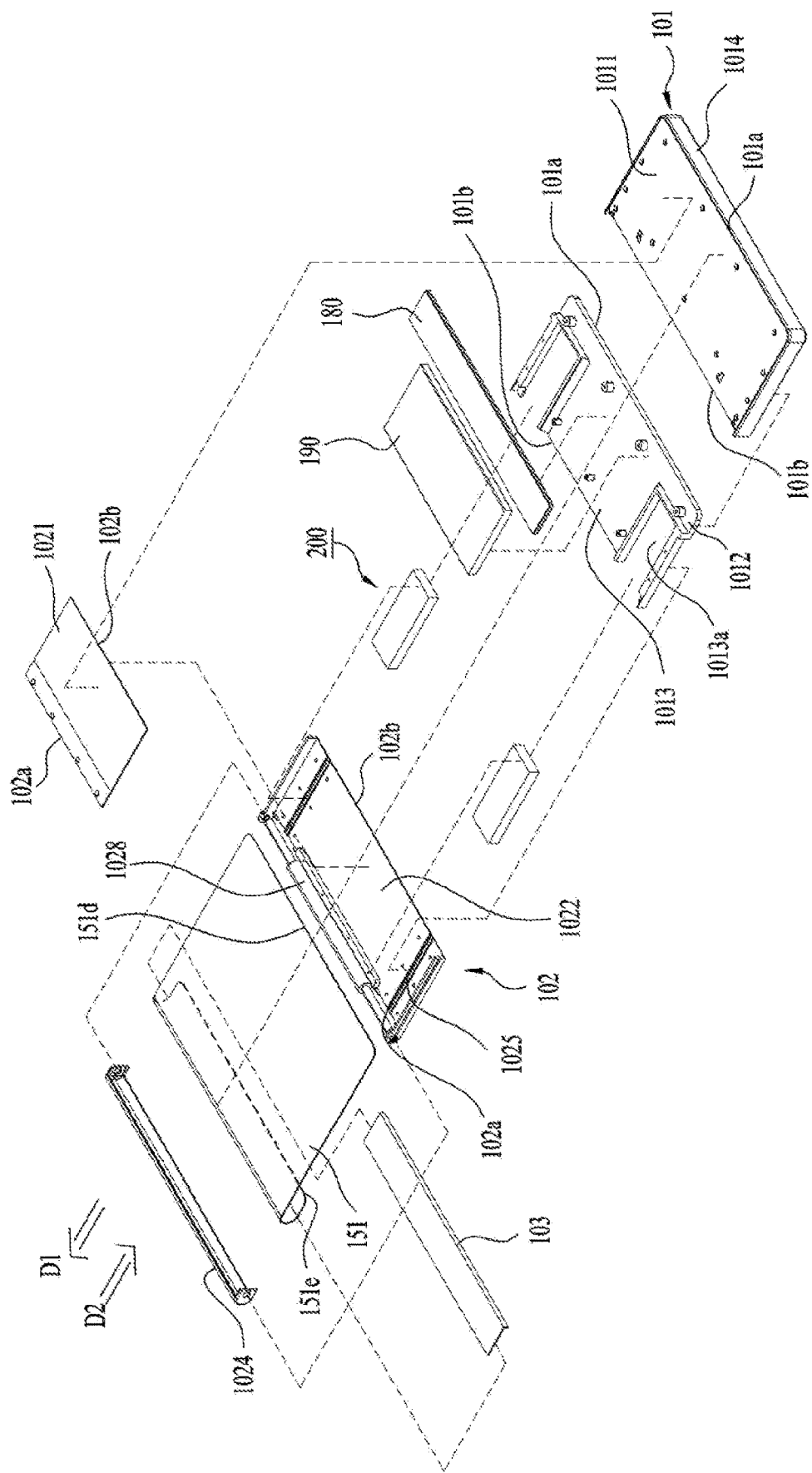
FIG. 3 is an exploded perspective view of a mobile terminal according to one embodiment.
Figure 4:
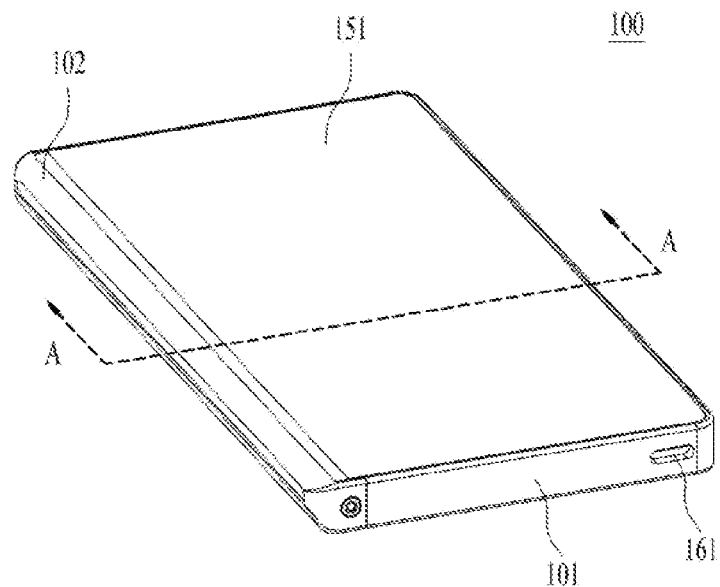
FIG. 4 shows perspective views respectively illustrating a first state and a second state viewed from one side of a mobile terminal according to one embodiment.
Figure 4:
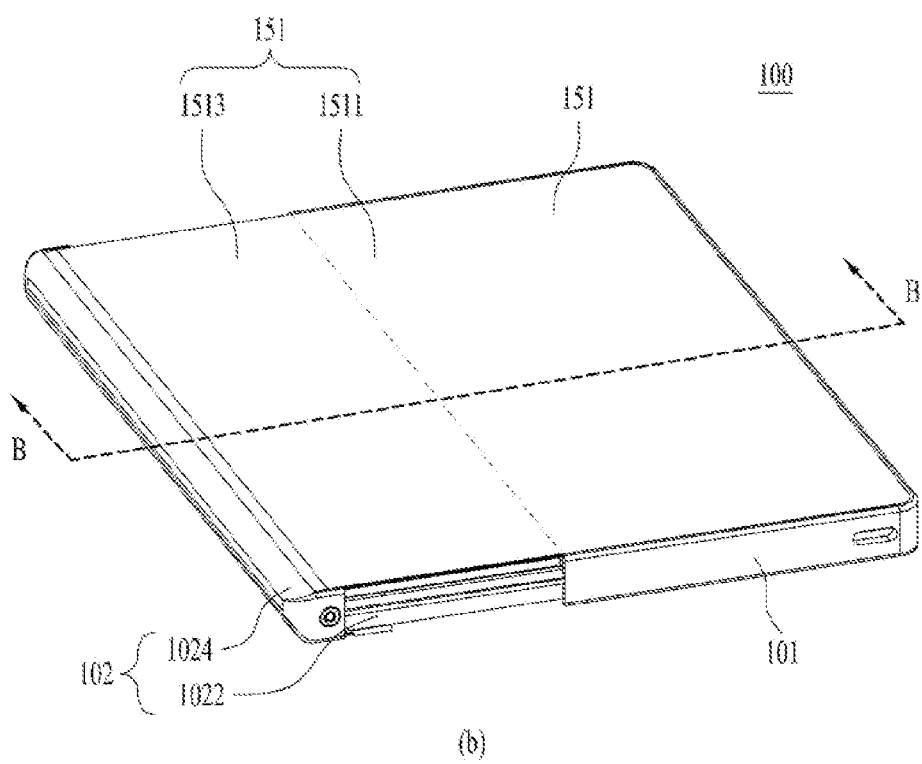
Figure 5:
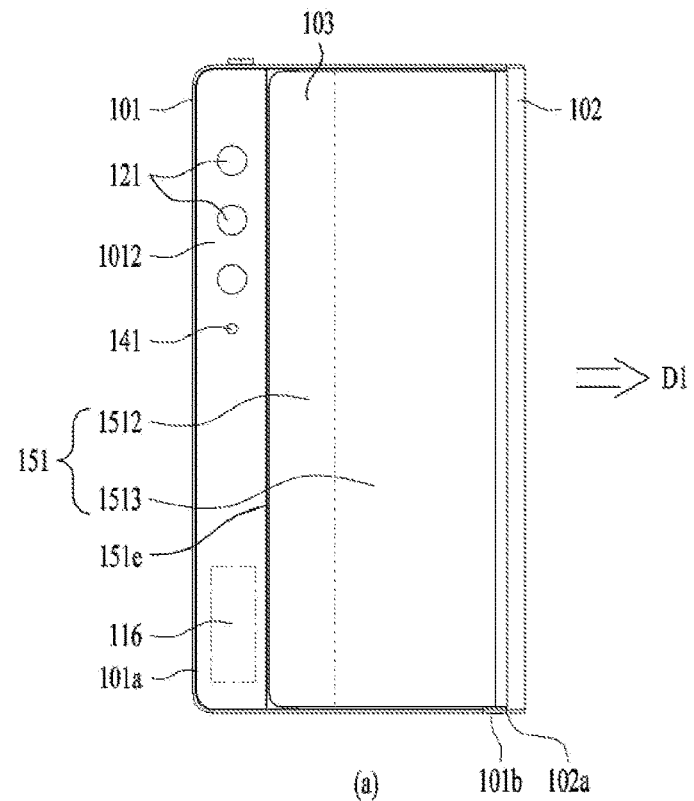
FIG. 5 shows rear face views respectively illustrating a first state and a second state of a mobile terminal according to one embodiment.
Figure 5:
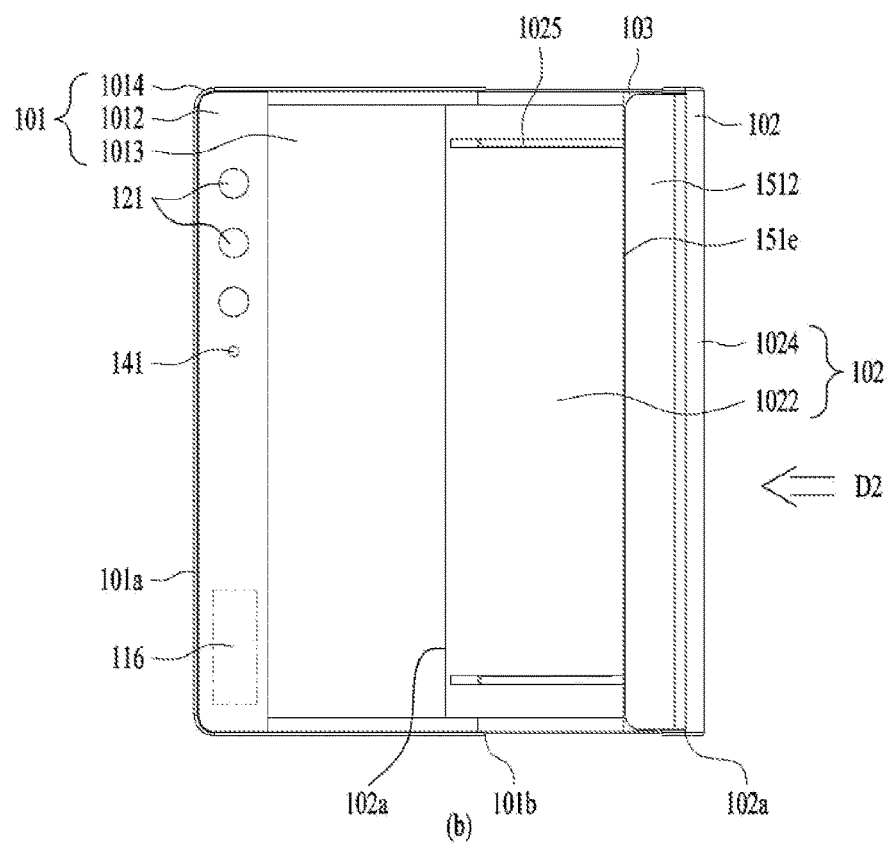
Figure 6:
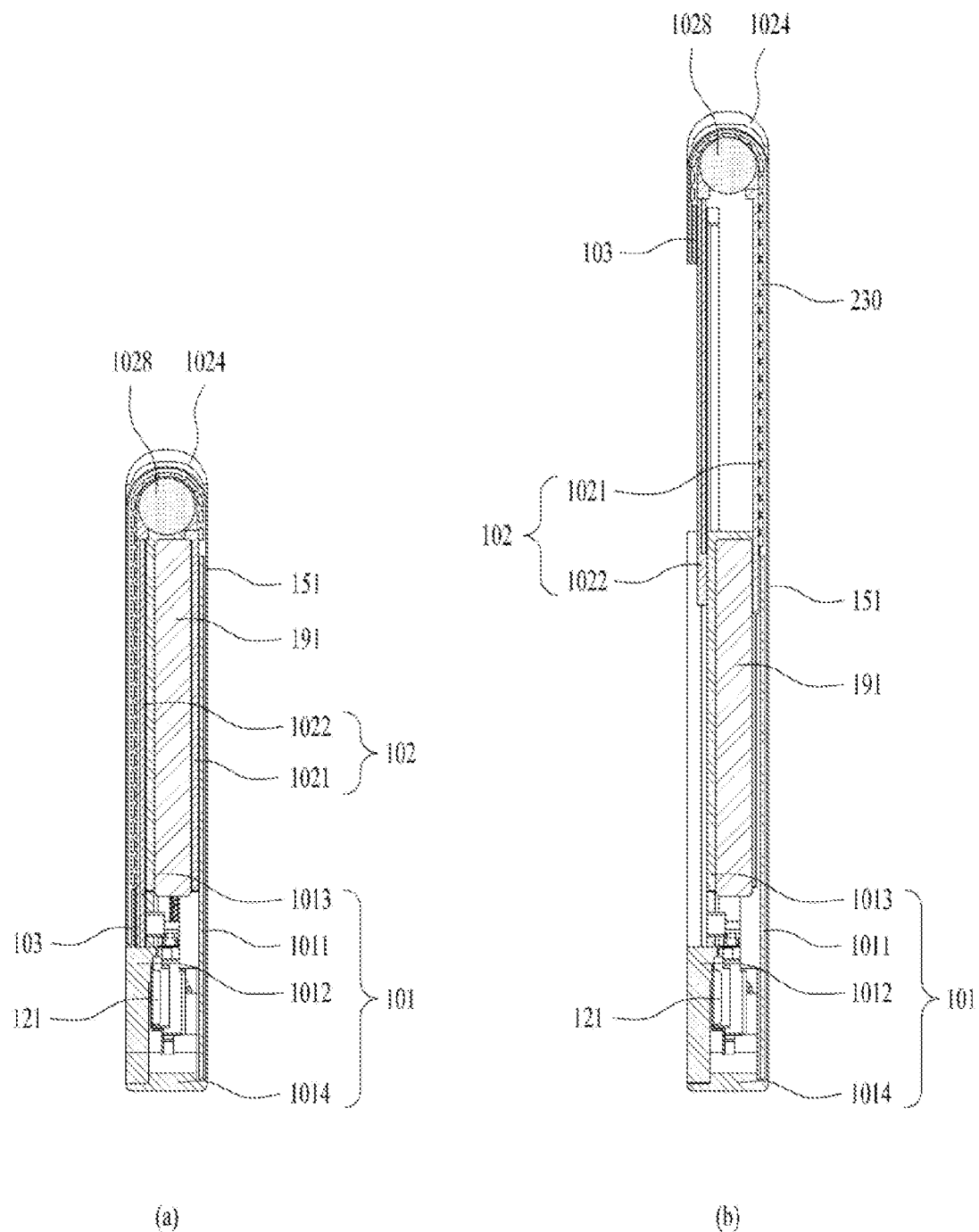
FIG. 6 shows cross-sectional views respectively taken along a line A-A and a line B-B of FIG. 4.

FIG. 3 is an exploded perspective view illustrating a mobile terminal 100 according to the present disclosure. FIG. 4 is a perspective view illustrating first and second states of a mobile terminal viewed in one lateral side. FIG. 5 is a rear view illustrating first and second states of a mobile terminal. FIG. 6 is a sectional view illustrating first and second states of a mobile terminal, obtained along the cutting lines A-A and B-B of FIG. 4, respectively. In the above drawings, FIG. 4(*a*), FIG. 5(*a*) and FIG. 6(*a*) illustrate a first state of a mobile terminal and FIG. 4(*b*), FIG. 5(*b*) and FIG. 6(*b*) illustrates a second state of the mobile terminal.

As illustrated in the drawings, a mobile terminal 100 of a first state is contracted (or retracted) and has a size smaller than that of the mobile terminal 100 of a second state. Moreover, a size of a display 151 located on a front surface of the mobile terminal 100 becomes smaller than that in a second state. On the other hand, the mobile terminal 100 of the first state is extended in a first direction D1 so as to switch to the second state. In the second state, a size of the mobile terminal 100 and a size of the first display of the display 151 become greater than those of the first state. In the following description, a direction in which the mobile terminal 100 and the display 151 thereof are extended (or expanded) is referred to as a first direction D1, a direction in which the mobile terminal 100 and the display 151 thereof are contracted (or retracted) or reduced is referred to as a second direction D2, and a direction vertical to the first and second directions D1 and D2 is referred to as a third direction.

The mobile terminal 100 of the present disclosure may switch from the first state in which the display 151 is located on the front surface like a bar-type mobile terminal like FIG. 4(*a*) to the second state by extending the screen like FIG. 4(*b*). In the second state, a size of the first display of the display 151 is enlarged and a size of the second display 151*b* of the display 151 is reduced like FIG. 5(*b*). Namely, the display 151 used to be located on the rear surface of the mobile terminal 100 in the first state is moved to the front surface of the mobile terminal 100 in the second state.

Thus, in order for a position of the display to be variable, the display may employ a flexible display unit 151. A flexible display means a display that is light-weighted, easily-unbreakable and heavy-duty display fabricated on a thin and flexible substrate capable of curving, bending, folding, twisting and rolling-up like a paper by maintaining the properties of the existing flat panel display.

Moreover, an electronic paper employs a display technology provided with the features of the normal ink and may differ from the existing flat panel display in using reflective light. The electronic paper may change information by electrophoresis using twist balls or capsules.

In a state that the flexible display unit 151 is not deformed (e.g., a state having an infinite curvature radius: hereinafter a basic state), a display region of the flexible display unit 151 becomes a plane. In a state deformed from the basic state by an external force (e.g., a state having a finite curvature radius: hereinafter a deformed state), the display region may become a curved surface. As illustrated in the drawing, information displayed in the deformed state may become visual information outputted to the curved surface. Such visual information is implemented in a manner that light emittance of subpixels deployed in a matrix form is controlled independently. The subpixel means a minimum unit for implementing a single color.

The flexible display unit 151 may lie not in a flat state but in a curved state (e.g., a top-bottom or right-left curved state) from the basic state. In this case, if an external force is applied to the flexible display unit 151, the flexible display unit 151 may be deformed into a flat state (or a less-curved state) or a more-curved state.

Meanwhile, the flexible display unit 151 may implement a flexible touchscreen by being combined with a touch sensor. If a touch is applied to the flexible touchscreen, the controller 180 (see FIG. 1) may perform a control in response to such a touch input. The flexible touchscreen may be configured to sense a touch input in the deformed state as well as in the basic state.

The touch sensor senses a touch (or a touch input) applied to the touchscreen using at least one of various touch types such as a resistance layer type, an electrostatic capacitance type, an infrared type, an ultrasonic type, etc.

For example, a touch sensor may be configured to convert a pressure applied to a specific portion of a touchscreen or a variation of electrostatic capacitance generated from the specific portion into an electric input signal. A touch sensor may be configured to detect a position or size of the touch sensor touched by a touch target applying a touch to a touchscreen, a pressure of the touch, an electrostatic capacitance of the touch, etc.

Meanwhile, a deformation sensing means for sensing deformation of the flexible display unit 151 may be provided to the mobile terminal 100. Such a deformation sensing means may be included in the sensing unit 140 (see FIG. 1).

The deformation sensing means is provided to the flexible display unit 151 or the case (or housing) (i.e., first to third frame 101 to 103 described later), thereby sensing information related to deformation of the flexible display unit 151. Here, the information related to the deformation includes a deformed direction of the flexible display unit 151, a deformed extent, a deformed position, a deformed time, a restored acceleration of the deformed flexible display unit 151, etc., and may further various kinds of information sensible as the flexible display unit 151 is curved.

Based on the information related to the deformation of the flexible display unit 151 and sensed by the deformation sensing means, the controller 180 may change information displayed on the flexible display unit 151 or generate a control signal for controlling a function of the mobile terminal 100.

The size changes of the display unit 151 on the front and rear surfaces of the mobile terminal according to the state switching (first or second state) of the flexible display unit 151, i.e., the size change of the mobile terminal 100 may be performed manually by a force applied by a user, which is non-limited by the manual way. For example, when the mobile terminal 100 or the flexible display unit 151 is in the first state, it may be deformed into the second state by a command of a user or application without an external force applied by the user. Thus, in order for the flexible display unit 151 to be automatically deformed without such an external force, the mobile terminal 100 may include a driving unit 200 described later.

The flexible display unit 151 of the present disclosure is rolled round a predetermined one of both side parts of the mobile terminal 100, thereby being folded at 180°. Hence, one portion of the display unit 151 is disposed on the front surface of the mobile terminal 100 with reference to such a side part, while the rest is disposed on the rear surface of the mobile terminal 100. Some portion of the display unit 151 located on the front surface of the mobile terminal 100 may be fixed to the front surface not to move, while the rest of the display unit 151 located on the rear surface of the mobile terminal 100 may be provided to be movable on the rear surface.

The display unit 151 may be rolled or unrolled round the side part, whereby a size of the region disposed on the front surface of the mobile terminal 100 may be adjusted by moving a part of the display unit 151 disposed on the rear surface of the mobile terminal 100. Since a size of the flexible display unit 151 is determined and the flexible display unit 151 includes a single continuous body, if a size of the first display 151a is increased, a size of the second display 151b is decreased. The above-configured display unit 151 may be rolled within the second frame 102 relatively movable to the first frame 101, which will be described later, and more specifically, around a predetermined side part of the second frame 102, and withdrawn (or pulled out) from or inserted (or pushed) into the second frame 102 by being rolled around the second frame 102 along a moving direction of the second frame 102 to adjust the size of the display unit 151 on the front surface of the mobile terminal 100. Such an operation will be described in detail together with other related components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

With reference to FIGS. 3 to 6, a detailed configuration of the mobile terminal 100 of the present disclosure will be described in detail below. A following description will be achieved basically with reference to FIG. 3 illustrating an overall configuration. FIGS. 4 to 6 are referred to to explain detailed features of corresponding components in the first and second states of the mobile terminal 100.

The mobile terminal 100 of the present disclosure includes a body in which components are mounted, and the body of the present disclosure may vary in size in the first direction as shown in FIG. 3. One or more frames move relative to each other, and sizes thereof may vary in the first direction. Electronic components are mounted in the body, and the flexible display unit 151 is located out of the body.

Since the mobile terminal 100 of the present disclosure includes the flexible display unit, the flexible display unit 151 may be combined in a form surrounding a front face and a rear face of the body. The body may include first to third frames 101 to 103. The body may include the first frame 101, the second frame 102 moving in the first direction with respect to the first frame 101, and the third frame 103 moving in the first direction with respect to the second frame 102. The first frame 101 and the second frame 102 include front portions, a rear portions, and side portions, respectively, and are coupled to each other. Thus, the mobile terminal 100 may have a hexahedral outer shape by such coupled first and second frames 101 and 102. In consideration of an illustrated configuration of the first to third frames 101 to 103, movements of the second and third frames 102 and 103 may be a slide movement.

First of all, the first frame 101 corresponds to a main body of the mobile terminal 100 and may form a space inside to receive various parts therein. And, the first frame 101 may receive the second frame 102, which is movably coupled to the first frame 101, within such a space. Particularly, as illustrated in FIG. 3 and FIG. 6, the first frame 101 may include a first front part 1011 disposed on the front surface of the mobile terminal 100 and first and second rear parts 1011 and 1012 disposed on the rear surface of the mobile terminal 100.

Each of the first front part 1011, the first rear part 1012 and the second rear part 1013 may include an approximately flat plate-type member. The first rear part 1012 and the second rear part 1013 may include separate members coupled together or a single member illustrated in the drawing. In order to form a predetermined space, the first font part 1011 and the first/second rear part 1012/1013 may be spaced apart from each other in a predetermined gap and connected to each other by a lateral part 1014. As parts of the mobile terminal 100, the controller 180 and the power supply unit 190 may be received in the space within the first frame 101. For example, the controller 180 may include a circuit board including a processor and electronic circuit for controlling operations of the mobile terminal 100 and the power supply unit 190 may include a battery and related parts. Moreover, the second frame 102 and the driving unit 200 described alter may be received in the first frame 101 as well.

As described above, the display unit 151 has the continuous body, and thus, may be disposed on both the first display and the rear display 151b of the mobile terminal 100 while being rolled in the mobile terminal 100. The display unit 151 may include the first display positioned at the first display of the mobile terminal 100, the rear display 151b positioned at the rear display 151b of the mobile terminal 100, and a third display positioned between the first display and the rear display 151b thereof and surrounding the side face of the mobile terminal. The first display and the rear display 151b are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the first frame 101 and the third frame 103. Because of being fixed to the first frame 101 and the third frame 103, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

A first region of the display unit 151 may be coupled to the first front portion 1011 corresponding to the front face of the mobile terminal 100.

On the other hand, as well illustrated in FIG. 5, for the installation of various physical input units 120 and sensor units 140 for manipulations of the mobile terminal 100, the display unit 151 may be disposed on the second rear part 1013 only. Since the first rear part 1012 is always exposed externally, the input unit 120 such as various buttons, switches, the camera 121 and a flash and the sensor unit 140 such as the proximity sensor 141 may be disposed on the first rear part 1012. A typical bar-type terminal includes a display unit provided to a front surface of the terminal only. Hence, a camera is disposed on a rear surface of the terminal in order to capture an image by viewing a thing located at the opposite side of a user through a display unit. In order for the user to capture himself by viewing himself through the display unit, an additional camera needs to be provided to the front surface of the terminal.

Yet, according to the mobile terminal 100 of the present disclosure, the display unit 151 is located on both of the front and rear surfaces thereof. Therefore, when a user takes a selfie, the display unit located on the same side of the camera 121, i.e., a portion of the display unit 151 located on the rear surface of the mobile terminal 100 in the drawing may be used. When a thing at the opposite side of the user is captured, the display unit located on the opposite side of the camera 121, i.e., a portion of the display unit 151 on the front surface of the mobile terminal 100 in the drawing may be used. For that reason, the mobile terminal 100 may capture a thing located at the opposite side of a user or a selfie using the single camera 121. The camera may include a plurality of cameras of different view angles such as a wide angle, a super wide angle, a telescope, etc. A proximity sensor, an audio output module and the like may be located on the first rear part 1012 as well as the camera, and an antenna 116 may be installed thereon.

The lateral part 1014 may be elongated along edges of the first front part 1011 and the first/second rear part 1012/1013 to enclose a circumference of the first frame 101 and form an exterior of the mobile terminal 100. Yet, as mentioned above, since the second frame 102 is received in the first frame 101 and movably coupled thereto, a portion of the first frame 101 needs to be open to allow the relative movement of the second frame 102 to the first frame 101. As well illustrated in FIG. 3, for example, since the second frame 102 is movably coupled to one of both side parts of the first frame 101. Hence, the first frame 101 may include a first side part 101a substantially closed and a second side part 101b disposed to oppose the first side part 101a so as to be open. Since the lateral part 1014 is exposed from the mobile terminal 100, the interface unit 160 for connecting to a power port or an earphone jack or the user input unit 120 such as a volume button and the like may be disposed thereon. In case of containing metal substance, the lateral part 1014 may play a role as an antenna.

The second rear portion 1013 of the first frame 101 may be covered by the display unit, but may be disposed on the front face of the display unit using a transparent material.

Referring to FIG. 2, the second frame 102 may include a second front part 1021 disposed on the front surface of the mobile terminal 100 and a third rear part 1022 disposed on the rear surface of the mobile terminal 100. Like the first front part 1011, the first rear part 1012 and the second rear part 1013 of the first frame 101, each of the second front part 1021 and the third rear part 1022 may be formed of an approximately flat plate-type member. Moreover, the second frame 102 may receive various parts therein and should not interfere with the parts received in the first frame 101 while moving. Hence, the second front part 1021 and the third rear part 1022 may be coupled together in a manner of being spaced apart from each other and have a shape not interfering with the parts within the first frame 101.

Moreover, the display unit 151 may be folded at 180° while being rolled up within the second frame 102 so as to be disposed on both of the front and rear surfaces of the mobile terminal 100. For such arrangement of the display 151, the second frame 102 may include a roller 1028 rotatably disposed therein. The roller 1028 may be disposed at a random position within the second frame 102. Yet, the display 151 should be spread flat on the front and rear surfaces of the mobile terminal 100 to provide a user with a screen of a good quality. For such a spread, an appropriate tension should be provided to the display 151. In order to provide the proper tension, the roller 1028 may be disposed at a first directional end of the second frame 102. The roller 1028 may extend in the third direction, and may be rotatably coupled to the second frame 102.

The display unit 151 may be rolled around the roller 1028 by being gradually curved with a predetermined curvature. Moreover, the roller 1028 may be installed to freely rotate on the second frame 102 by contacting with an inner surface of the display unit 151. Therefore, the roller 1028 is substantially capable of moving the display unit 151 in a direction vertical to a lateral direction, i.e., a length direction of the mobile terminal 100. As described later, when the second frame 102 is slid, the display unit 151 is moved by the tension applied by the second frame 102 to the front or rear surface of the mobile terminal 100 relatively to the second frame 102 in a different direction (i.e., the first direction D1 or the second direction D2). In doing so, such a movement may be guided by the roller 1028 that is rotating.

In addition, the roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the roller 1028 and the display unit 151 rolled thereon. That is, the side frame 1024 covers the side face of the display unit 151, and the side face thereof is located in the third region. The first to third regions are at specified positions on the flexible display unit 151 and do not change in size or position, but the sizes of the first display and the second display 151b, and the position of the side face are determined based on the state of the body.

The first region and the second region correspond to the fixed portion described above, and the third region corresponds to the variable portion described above.

The third region may vary in position depending on the state of the mobile terminal. Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side face 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, as shown in FIG. 6. That is, a front face of the second front portion 1021 may face the rear face of the first front portion 1011. In addition, the rear face of the first front portion 1011 may be in contact with the front face of the second front portion 1021 to stably support the movement of the second frame 102.

The third rear portion 1022 of the second frame 102 may be disposed below the second rear portion 1013 of the first frame 101. That is, the front face of the third rear portion 1022 may face the rear face of the second rear portion 1013. In addition, the rear face of the second rear portion 1013 may be in contact with the front face of the third rear portion 1022 to stably support the movement of the second frame 102. Because of such arrangement, the third rear portion 1022 may be exposed to the outside of the first frame, more precisely, of the second rear portion 1013, and may be coupled to the display unit 151.

Alternatively, when the second rear portion 1013 is made of a transparent material, the second rear portion 1013 may form an outer shape of the rear face of the mobile terminal. The second rear portion 1013 may be positioned rearward of the third rear portion 1022 of the second frame, and the flexible display unit may be disposed between the second rear portion 1013 and the third rear portion 1022 in the first state.

When the second rear portion 1013 is made of a material such as a transparent glass to form the outer shape of the rear face of the mobile terminal, the first rear portion 1012 may be implemented using the same member as the second rear portion 1013. That is, the camera 121, the flash or the sensing unit 140, and the like may be arranged by partially coating the plate-shaped member of the transparent glass material to not allow the internal components to be visible and by not coating only a required portion.

In addition, the second frame 102 may expand and contract the size of the mobile terminal 100 itself, particularly the front face of the mobile terminal 100 by the expansion and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is expanded or contracted. For this reason, the display unit 151 may be movably coupled to the second frame 102. More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the third rear portion 1022 of the second frame 102, the second side edge 151e may be coupled the third rear portion 1022 of the second frame 102 to be movable in the first and second directions D1 and D2. In addition, since the display unit 151 is not structurally strong, a third frame 103 may be coupled to the second side edge 151e. The third frame 103 may be formed of a plate-shaped member extending in the longitudinal direction of the mobile terminal 100. Accordingly, the third frame 103 may be coupled to the second frame, that is, the third rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the third frame 103 may be stably moved while being guided by the slot 1025. The third frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 1511 extending from one side thereof, that is, the first side edge 151d toward the second side edge 151e by a predetermined length, and a second region 1512 disposed opposite the first region 1511, and extending from the second side edge 151e toward the first side edge 151d by a predetermined length. In addition, the display unit 151 may include a third region 1513 disposed between the first and second regions 1511 and 1512. Such first to third regions 1511, 1512, and 1513 may be connected to each other, and may form a continuous body of the display unit 151. In addition, as described above, for the movement of the third region 1513 toward the front face or the rear face of the mobile terminal 100 depending on the moving direction of the second frame 102, the first region 1511 may be fixed so as not to move to the front face of the mobile terminal 100, and the second region 1512 may be provided to be movable on the rear face of the mobile terminal. Such configuration of the display unit 151 will be described in more detail below.

The first region 1511 may be disposed on the front face of the mobile terminal 100, more specifically, the first frame 101, that is, on the front face of the first front portion 1011. The first region 1511 is fixed to the first frame 101, that is, the front face of the first front portion 1011 so as not to be moved during the movement of the second frame 102, and thus, the first region 1511 may always be exposed to the front face of the mobile terminal 100. The third region 1513 may be adjacent to the first region 1511, and may extend into the second frame 102 and rolled on the roller 1028. The third region 1513 may consecutively extend out of the second frame 102 again and partially cover the second frame 102, that is, the rear face of the third rear portion 1022. Further, the second frame 102, that is, the third rear portion 1022, is adjacent to the first frame 101, that is, the second rear portion 1013 and together forms the rear case of the mobile terminal 100, so that it may be described that the third region 1513 is also disposed on the rear face of the first frame 101.

The second region 1512 may be adjacent to the third region 1513 and may be disposed on the rear face of the mobile terminal 100, more specifically, on the second frame, that is, the rear face of the third rear portion 1022 thereof. The second region 1512 may be coupled to the third frame 103 without being directly coupled to the second frame 102. As shown in FIG. 5(b), the slot 1025 extending in the lateral direction (i.e., the direction perpendicular to the longitudinal direction of the mobile terminal 100) to the second frame 102, that is, to the third rear portion 1022 is defined. Further, the third frame 103 may move along the slot 1025. In FIG. 5(b), it is shown that the slot 1025 is defined in the rear face of the second frame 102, but may be defined in the side face of the second frame 102. Although the second region 1512 may move in the first or second direction D1 or D2 with respect to the second frame 102 together with the third frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 1511 may be disposed on the front face of the mobile terminal 100 and may be always exposed to the front face regardless of the movement of the second frame 102, and the second region 1512 may be disposed on the rear face of the mobile terminal 100 and may be always exposed to the rear face regardless of the movement of the second frame 102. In addition, the third region 1513 may be disposed between the first and second regions 1511 and 1512, and may be selectively placed on the front face or the rear face of the mobile terminal 100 depending on the moving directions D1 and D2 of the second frame 102.

Because of such selective placement of the third region 1513, as shown in FIG. 5(b), the second rear portion 1013 of the first frame 101 is covered by the second and third regions 1512 and 1513 and the third rear portion 1022 of the display unit 151 in the first state, but the third region 1513 moves to the front face of the mobile terminal 100 in the second state, and the third rear portion 1022 also moves in the first direction D1, so that the mobile terminal 100 may be exposed to the outside. In addition, the second front portion 1021 of the second frame 102 is disposed below the first front portion 1011 of the first frame 101 in the first state, but is moved out of the first frame 101 and supports the third region 1513 of the display unit 151 disposed on the front face of the mobile terminal 100 in the second state.

Since the first and second regions 1511 and 1512 are always respectively arranged on the front face and the rear face of the mobile terminal 100, curvatures of the first region 1511 and the second region 1512 do not change, and the first region 1511 and the second region 1512 may be maintained in a flat basic state. However, the third region 1513 may be rolled on the roller 1028 and bent in the second frame 102. When converting from the first state to the second state, the third region 1513 may extend from the second frame 102 to the front face of the mobile terminal 100 while being rolled on the roller 1028 in one direction. On the other hand, when converting from the second state to the first state, the third region 1513 may be retracted from the front face of the mobile terminal 100 to the second frame 102 while being rolled on the roller 1028 in the opposite direction, and at the same time, may return to the rear face of the mobile terminal 100 from the second frame 102. A specific location of the foldable mobile terminal in a form of being spread like a book is easily damaged because only the specific location is folded repeatedly. On the other hand, the deformed portion of the flexible display unit 151, that is, a portion rolled on the roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

As shown in FIGS. 4A, 5A, and 6A, the second frame 102 is fully retracted into the first frame 102 in the first state. Therefore, only the first region 1511 of the display unit 151 fixed to the front face of the first frame 101 may be exposed to the front face of the mobile terminal 100. Such first region 1511 may be fixed and supported to the first frame 101, that is, the first front portion 1011 thereof. In addition, a major portion of the third region 1513 may be disposed on the rear face of the mobile terminal 100 together with the second region 1512, and the third region 1513 may be disposed in the second frame 102 while being partially rolled on the roller 1028. The third region 1513 of the rear face of the mobile terminal 100 may be supported by the second frame, that is, the third rear portion 1022 thereof. The second region 1512 may be fixed by the third frame 103 disposed on the second frame (i.e., the third rear portion 1022) and may be movably coupled to the second frame 1012.

In such first state, when the second frame 102 moves in the first direction D1, the mobile terminal 100 may be converted into the second state. As shown in FIGS. 4B, 5B, and 6B, the second frame 102 may extend from the first frame 101 by the movement in the first direction D1, and may increase the overall size of the mobile terminal 100, in particular, the front face thereof. During the movement in the first direction D1, the second frame 102 may apply a force, that is, a tension, to the display unit 151 in the first direction D1. The display unit 151 is fixed to the first frame 101 but is coupled to the second frame 102 so as to be movable using the third frame 103, so that the force applied by the second frame 102 allows the third region 1513 to be rolled out from the roller 1028 of the second frame 102 to the front face of the mobile terminal 100. That is, the third region 1513 may be withdrawn (or pulled out) from the second frame 102 or extend to (or move out of) the second frame 102. At the same time, the third region 1513, particularly, the portion located on the rear face of the third region 1513 may be rolled into the roller 1028 of the second frame 102 from the rear face, or may be inserted (or pushed in), retracted, or moved into the second frame 102. Not an entirety of the third region 1513 is withdrawn from the second frame 102 to the front face of the mobile terminal 100, and a portion of the third region 1513 may be disposed in the second frame 102 while still being rolled on the roller 1028. In addition, for the smooth movement of the third region 1513, the second region 1512 may also move in the first direction D1 with respect to the second frame 102 together with the third frame 103. In addition, as described above, the second region 1512 and the third frame 103 may be constrained to the second frame 102 and move in the first direction D1 with respect to the first frame 101 together with the second frame 102. Accordingly, the second region 1512 and the third frame 103 may move in the first direction D1 relative to the first frame 101 as well as the second frame 102, and accordingly, move a distance longer than the moved distance of the second frame 102. Thus, because of such long distance movement in the first direction D1 of the second region 1512, the third region 1513 may be smoothly extended to the front face of the mobile terminal 100. Further, for the movement of the third region 1513, which is proportional to the expansion of the second frame 102, the movement of the second region 1512 and the third frame 103 in the first direction D1 may be performed simultaneously with the movement of such third region 1512 and second frame 102 in the first direction D1 so as to be proportional to the movement of third region 1513 and second frame 102.

When the second frame 102 is fully extended in the first direction D1, the first and third regions 1511 and 1513 may be arranged on the front face of the mobile terminal 100, and only the second region 1512 may be disposed on the rear face of the mobile terminal 100. Such first and third regions 1511 and 1513 may be supported by the first frame (i.e., the first front portion 1011 thereof) and the second frame (i.e., the second front portion 1021 thereof). In addition, the second frame 102, i.e., the third rear portion 1022 thereof exposes the second rear portion 1013 of the first frame while extending in the first direction D1, and supports the moving third region 1513. Therefore, in the second state, the mobile terminal 100 may have the extended front face display unit 151.

On the other hand, when the second frame 102 moves in the second direction D2 in the second state, the mobile terminal 100 may again return into the first state as shown in FIGS. 4A, 5A, and 6A. The second frame 102 may be contracted to the first frame 101 by the movement in the second direction D2, and may reduce the overall size of the mobile terminal 100, particularly the front face thereof. The movement of the display unit 151 during such movement of the second frame 102 may be performed in a reverse order of the movement in the first direction D1 described above. In brief, the third region 1513 may be rolled from the front face of the mobile terminal 100 into the roller 1028 of the second frame 102, or may be inserted, retracted, or moved into the second frame 102. At the same time, the third region 1513 may be rolled, withdrawn, extended, or moved out of the roller 1028 of the second frame 102 to the rear face of the mobile terminal 100. Not the entirety of the third region 1513 may be withdrawn from the second frame 102 to the rear face of the mobile terminal 100, and the portion of the third region 1513 may still be placed in the second frame 102 while still being rolled on the roller 1028. In addition, for such smooth movement of the third region 1513, the second region 1512 may also move in the second direction D2 with respect to the second frame 102 together with the third frame 103. The second region 1512 and the third frame 103 may be constrained to the second frame 102 to move in the second direction D2 with respect to the first frame 101 together with the second frame 102. Accordingly, the second region 1512 and the third frame 103 may move relatively in the second direction D2 with respect to not only the second frame 102 but also the first frame 101. As a result, the second region 1512 and the third frame 103 may move in the second direction D2 a distance larger than the moved distance of the second frame 102. Thus, because of such long distance movement of the second region 1512, the third region 1513 may be smoothly returned to the rear face of the mobile terminal 100. Further, for the movement of the third region 1513 proportional to the contraction of the second frame 102, the movements of the second region 1512 and the third frame 103 in the second direction D2 may be performed simultaneously with the movements of the third region 1512 and the second frame 102 in the second direction D2 to be proportional to the movements of the third region 1513 and the second frame 102. When the second frame 102 is completely contracted in the second direction D2, the mobile terminal 100 may be converted into the first state as described above, and may have the display unit 151 with the front face that is relatively reduced in comparison with the second state in the first state.

The mobile terminal 100 of the present disclosure may include the first display 151a located on one surface of the body and the second display 151b located on the other surface of the body, and may utilize the display unit 151 in a scheme different from that of a conventional mobile terminal using the two displays 151a and 151b. A plurality of applications may be simultaneously executed on the mobile terminal 100, and there may be a case in which a plurality of screens must be used alternately even in one application (multitasking).

Because a size of a screen of a computer is greater than that of the screen of the mobile terminal 100, it is easy to multitask by opening a plurality of windows in the computer, but it is difficult to multitask in the mobile terminal 100 because of the small screen. The mobile terminal 100 of the present disclosure may include the second display 151b on the other surface of the body or extend the body to provide a screen of the first display 151a wider than that of the conventional mobile terminal 100. The multitasking may be easily performed in the mobile terminal 100 using the two displays or the wider display.

A method for performing a multitasking operation using the first display 151a and the second display 151b will be described in more detail with reference to FIGS. 7 to 11. FIGS. 7 to 11 show one surface and the other surface of the mobile terminal 100 at the same time, and a surface with a larger size is oriented in a viewing direction of the user, that is, is a main display, and a surface with a smaller size is located on a side opposite to the surface viewed by the user.

The mobile terminal 100 may include a sensor for sensing a posture of the mobile terminal 100, such as a gyro sensor. Because the surface that the user views generally faces upwards, a surface that faces upwards may be determined as the surface that the user views and used as the main display.

Alternatively, when a user's face is sensed by the camera 121 located on the other surface of the mobile terminal 100, because the user is viewing the second display 151b, the second display 151b may become the main display. When the camera 121 does not sense the user's face, the first display 151a may become the main display used by the user.

Figure 7:
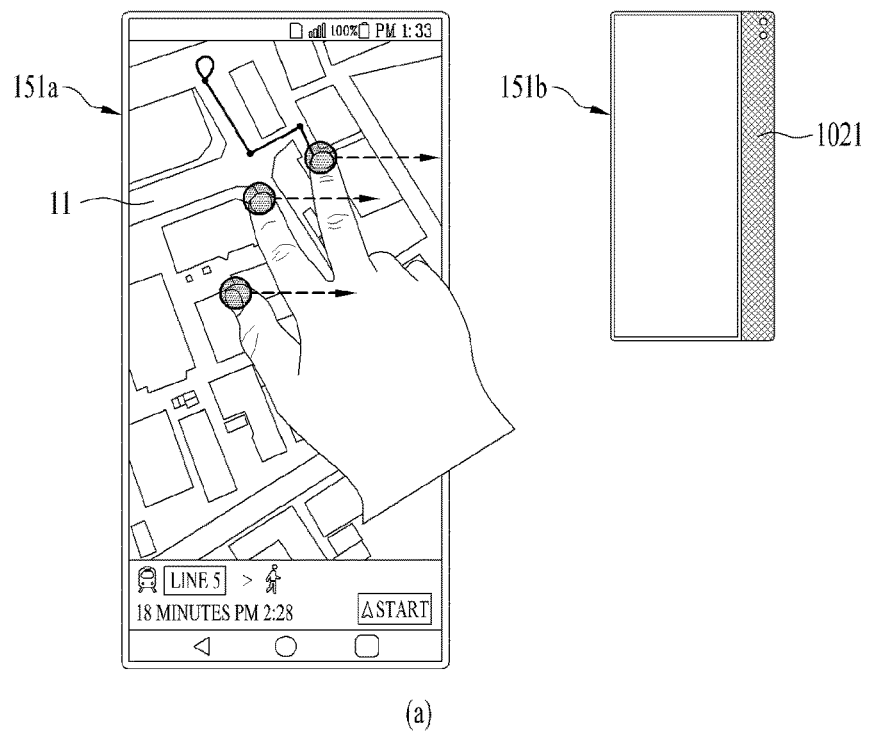
FIG. 7 is a view illustrating an operation of removing a first screen output on a first display of a mobile terminal in accordance with the present disclosure.
Figure 7:
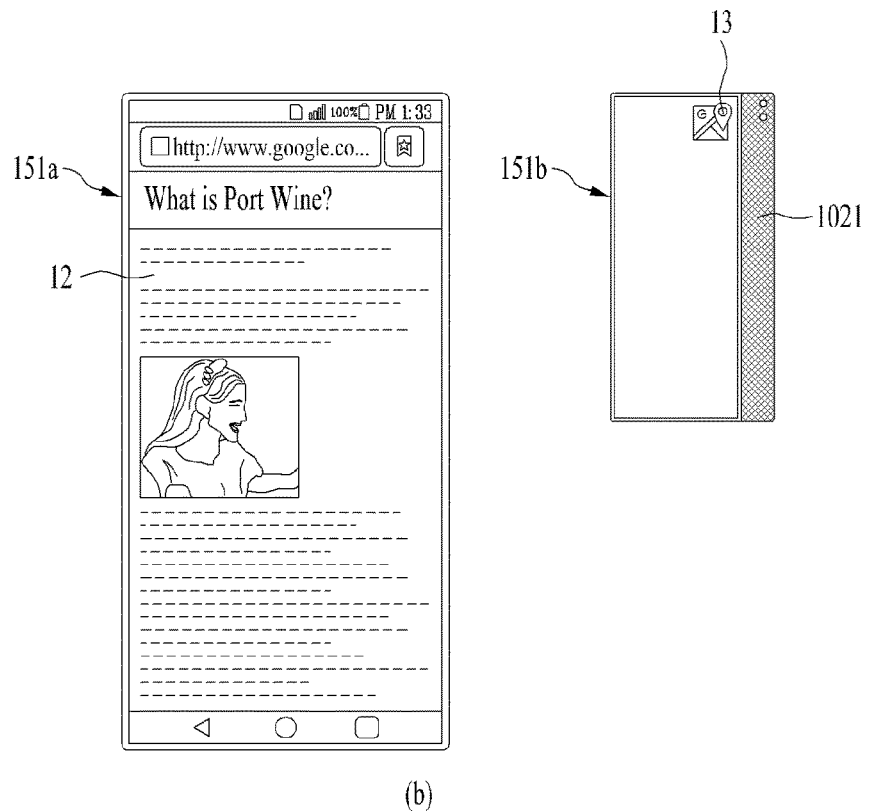

FIG. 7 is a view illustrating an operation of removing a first screen 11 output on the first display 151a of the mobile terminal 100 in accordance with the present disclosure, and the first screen 11 corresponding to a first application being used by the user is being output on the first display 151a. In this regard, the first application may be closed and a second application may be executed. Thereafter, when the first application is executed again, the conventional mobile terminal 100 had a problem in that the first application is initialized and a screen different from the first screen 11 is output.

The present disclosure uses the second display 151b to perform another task for a while while keeping the first screen 11 intact. When the user performs a first touch input as shown in (a) in FIG. 7, the first screen 11 disappears from the first display 151a as shown in (b) in FIG. 7. When the first screen 11 disappears, as shown in (b) in FIG. 7, the second screen 12 corresponding to a previously used application may be output, or an icon of a home screen may be output.

Alternatively, the first screen 11 may be output on the first display 151a as it is in the same state as a saved first screen 11. However, even when the user additionally manipulates the corresponding screen, the saved first screen 11 may maintain a state at a time point of being independently saved as it is. Accordingly, the user may perform the multitasking like displaying a plurality of websites or spreading a plurality of maps.

An icon corresponding to the saved first screen 11 may be output on the second display 151b as shown in (b) in FIG. 7. However, when the user is viewing the first display 151a, even when an image is output on the second display 151b, the user is not able to view the image. Thus, as shown in the second display 151b in (a) in FIG. 7, the second display may maintain an off state without separately displaying the image. In addition, as shown in (a) in FIG. 8, the icon may be finally output only when the user flips the body and dispose the body such that the other surface thereof faces the user.

The first touch input may be performed when a touch-and-drag input is performed with three fingers as shown in (a) in FIG. 7 in order to be distinguished from other conventional touch inputs. Alternatively, a touch-and-drag input with a larger area than the conventional touch input may be sensed as the first touch input. When the user increases a pressing force, a larger area may be touched, and such a touch input may be recognized as the first touch input. Alternatively, a touch-and-drag input with a predetermined pattern (e.g., an arc-shaped touch-and-drag input) may be recognized as the first touch input.

When both the first display 151a and the second display 151b are implemented using the flexible display unit 151 as shown in FIG. 3, the first touch input may include a touch-and-drag input in a direction of a third display for connecting the first display 151a and the second display 151b to each other.

When the first screen 11 is removed from the first display 151a using the first touch input as such, the removed first screen 11 may be preserved as it is saved in a clipboard, containing information about the state thereof. In this regard, the first screen 11 may be saved containing the state of the corresponding application without simply capturing the image. A plurality of the first screens 11 may be saved, and in this case, a plurality of icons may be displayed on the second display 151b as shown in (b) in FIG. 8.

Figure 8:
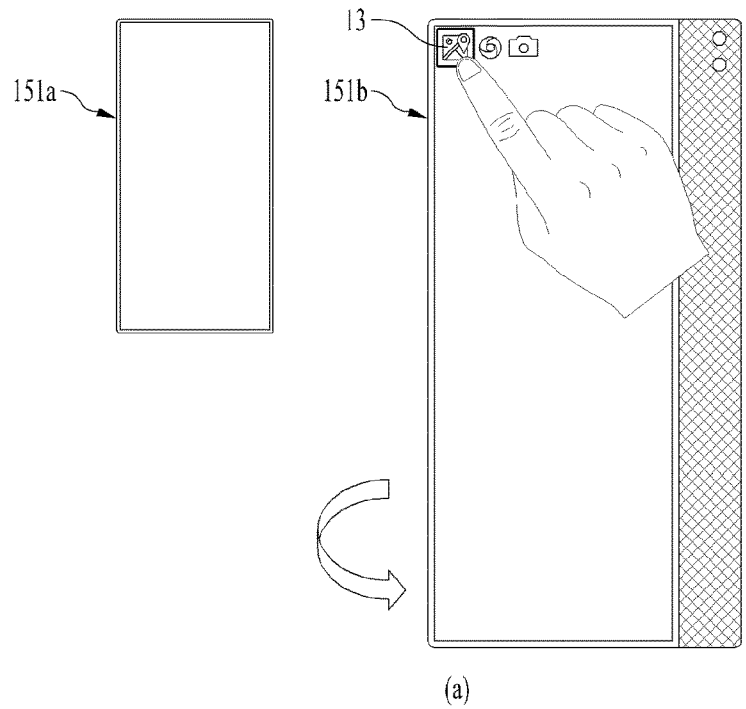
FIGS. 8 to 10 are views illustrating a first screen output on a second display in a state in which a mobile terminal in accordance with the present disclosure is flipped.
Figure 8:
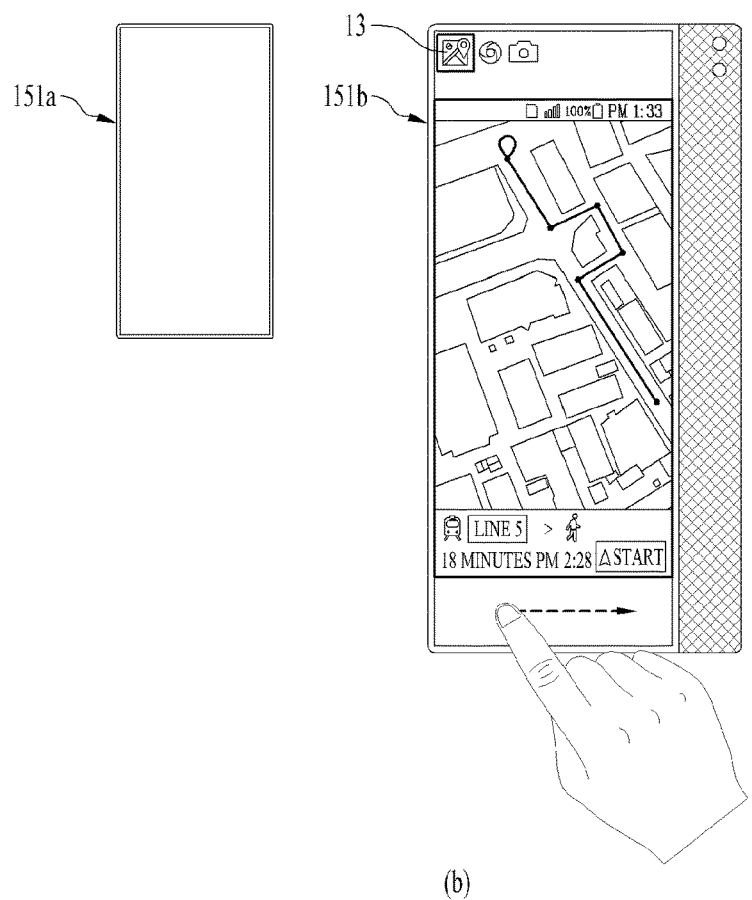
Figure 9:
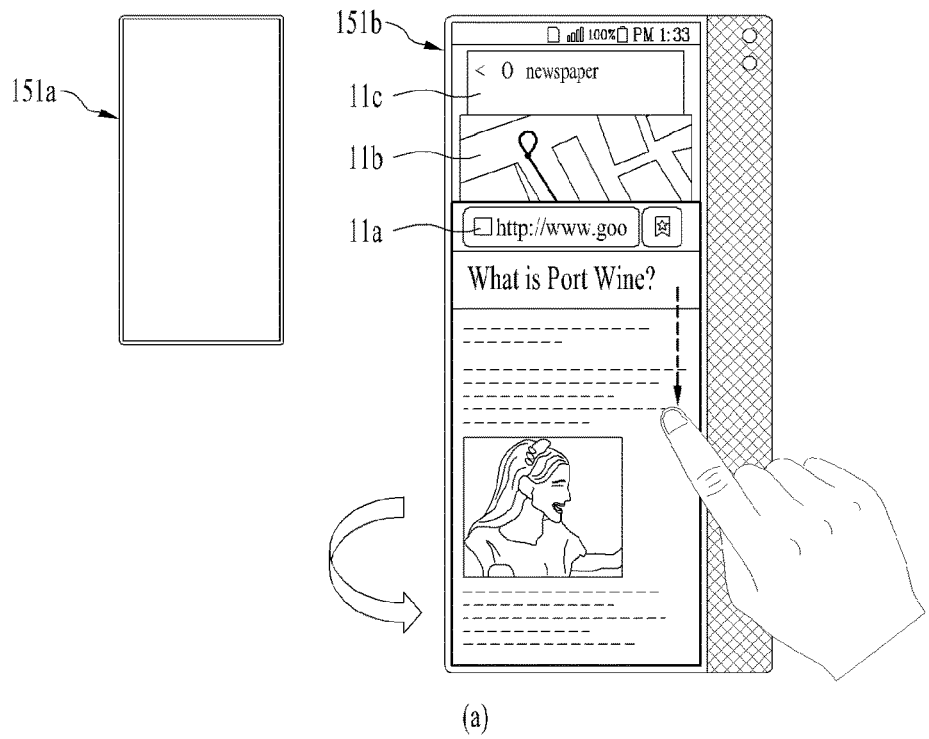
Figure 9:
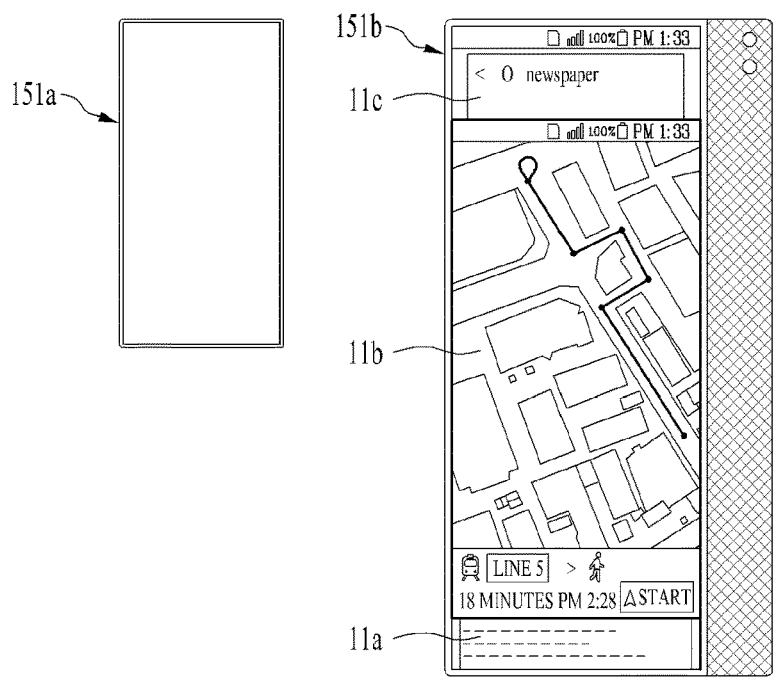
Figure 10:
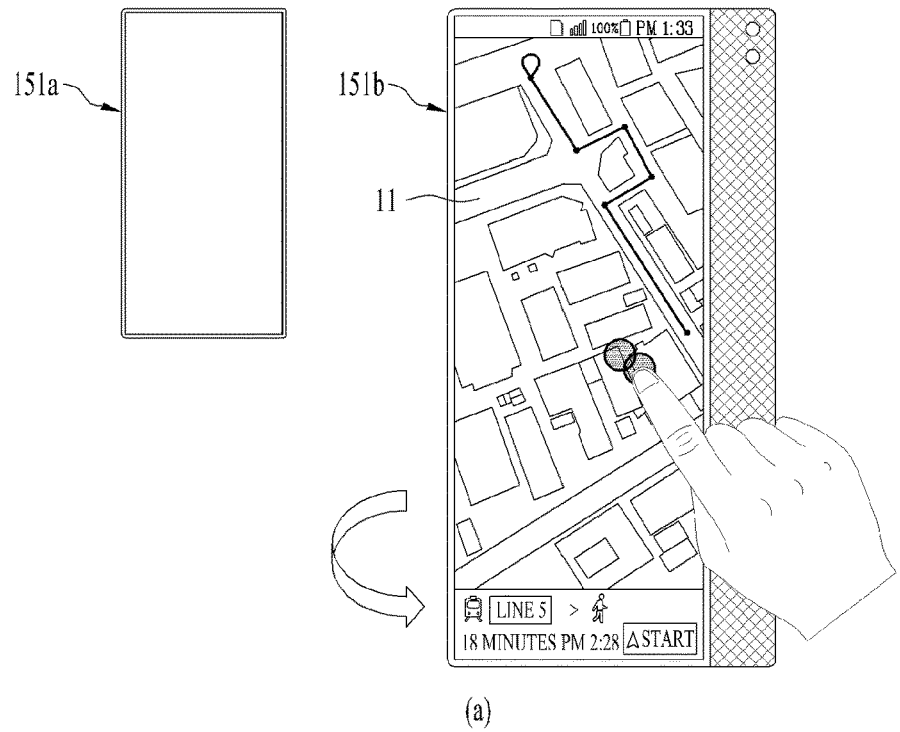
Figure 10:
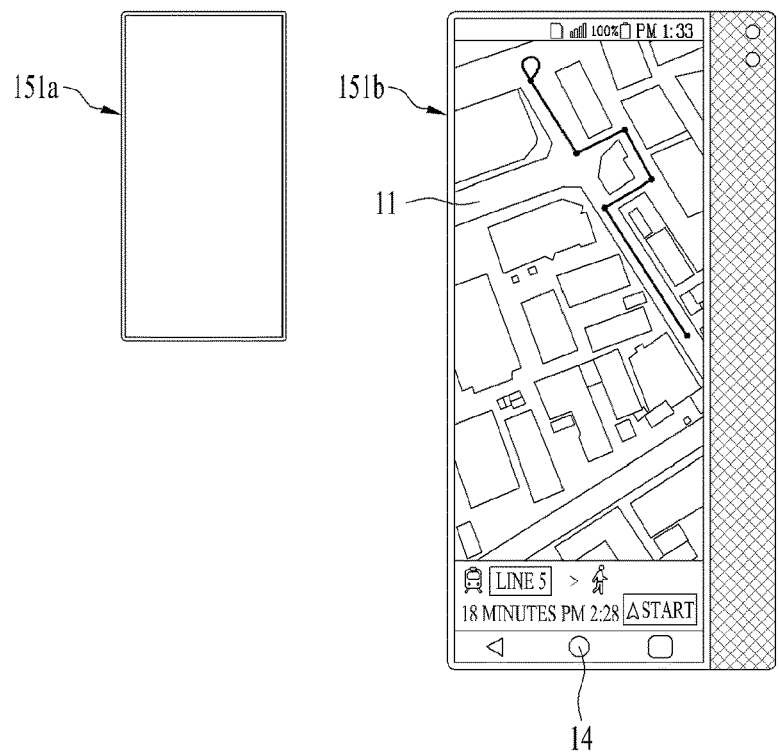

FIGS. 8 to 10 are views illustrating the first screen 11 output on the second display 151b in the state in which the mobile terminal 100 in accordance with the present disclosure is flipped. When the user flips the body to view the second display 151b, the mobile terminal 100 may switch the main display to the second display 151b by sensing a change in a position of the mobile terminal 100 using the gyro sensor or the like. In this regard, the first display 151a may be deactivated as shown in (a) in FIG. 8.

Only when the second display 151b becomes the main display, the second display 151b may be activated. At this time, an icon 13 or a thumbnail indicating the saved first screen may be displayed.

When the user selects the icon 13 as shown in (a) in FIG. 8, the first screen 11 removed from the first display 151a may be output on the second display 151b as shown in (b) in FIG. 8. In this regard, the first screen 11 may not occupy an entirety of the second display 151b, but may be output in only a portion as shown in (b) in FIG. 8. When the user touches a portion outside the first screen 11 output on the second display 151b, a first screen saved next to the currently output first screen 11 among the plurality of first screens 11 may be output. When the touch input is made within the first screen 11, the first screen 11 may change corresponding to the touch input (screen expanding, scrolling, and the like).

When the user flips the mobile terminal 100 and the second display 151b is switched to the main display, in addition to the icon, a plurality of saved first screens 11a, 11b, and 11c may be overlapped and output as shown in (a) in FIG. 9. The user may find the desired first screen 11b as shown in (b) in FIG. 9 by flicking the first screens 11a, 11b, and 11c that are overlapped and output.

When there is only one saved first screen 11, the saved first screen 11 may be immediately displayed on the second display 151b when the body is flipped as shown in (a) in FIG. 10. When the second display 151b is disposed on the rear surface for usability, a second touch sensor located on the second display 151b may be deactivated to ignore a touch input. Therefore, when it is desired to make the touch input through the second display 151b, the second touch sensor of the second display 151b may be activated. In (a) in FIG. 10, a locked state may be released through a touch (a knock code) corresponding to a specific pattern.

When the touch input is limited for the second touch sensor, a virtual key may not be output on the second display 151b. However, when the second touch sensor is activated, the virtual key 14 may be output on the second display 151b as shown in (b) in FIG. 10.

Figure 11:
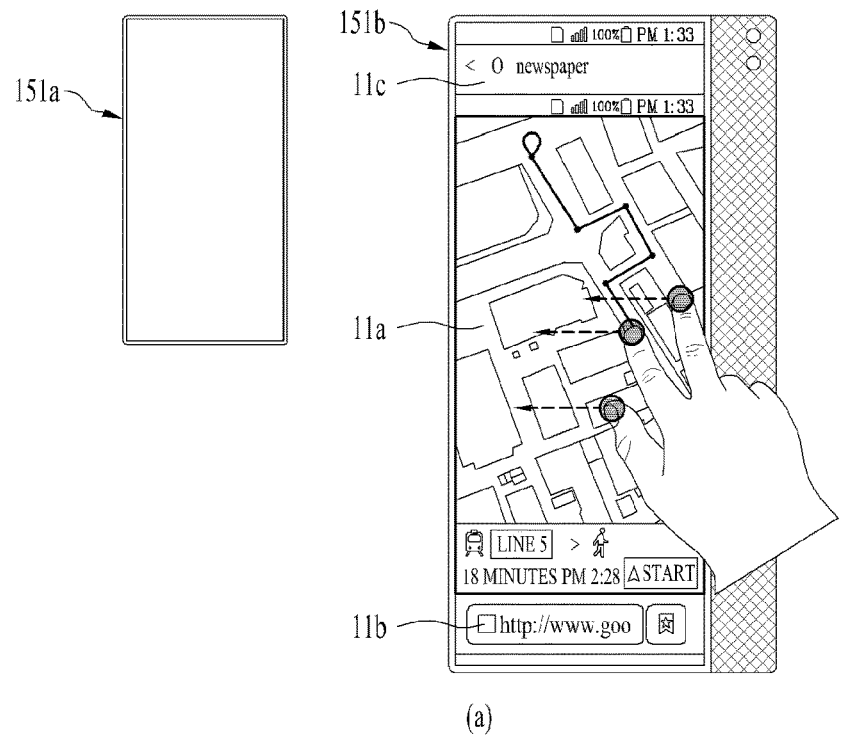
FIG. 11 is a view illustrating a method for transmitting a first screen output on a second display of a mobile terminal in accordance with the present disclosure to a first display.
Figure 11:
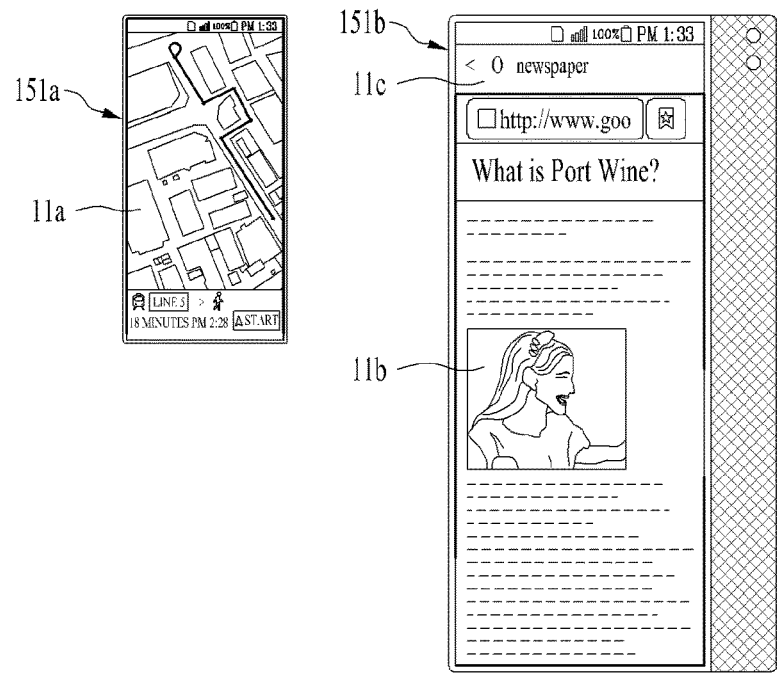

FIG. 11 is a view illustrating a method for transmitting the first screen 11 output on the second display 151b of the mobile terminal 100 in accordance with the present disclosure to the first display 151a. To view the first screen 11 saved on the second display 151b again on the first display 151a, as shown in (a) in FIG. 11, the first screen 11 may be moved from the second display 151b to the first display 151a through a second touch input. When the plurality of first screens 11 are saved, as shown in (b) in FIG. 11, the remaining first screens 11b and 11c may be output on the second display 151b or icons respectively corresponding to the remaining first screens 11b and 11c may be outputted. The second touch input may be oriented in the first direction in which the third display is oriented.

Figure 12:
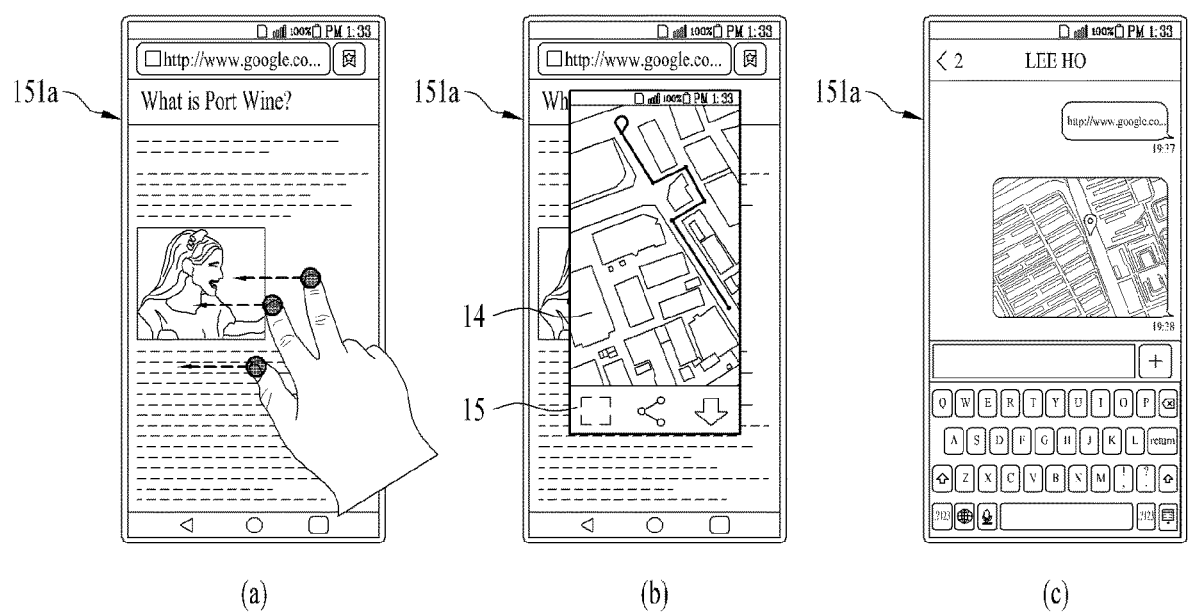
FIG. 12 is a view for illustrating an operation after recalling a first screen of a mobile terminal in accordance with the present disclosure.

FIG. 12 is a view for illustrating an operation after recalling the first screen 11 of the mobile terminal 100 in accordance with the present disclosure. After saving the first screen 11, the user may continue to use the first display 151a and open the first screen 11 again. As shown in (a) in FIG. 12, the first screen 11 may be called back onto the first screen 11 through a third touch input. The third touch input may be a touch-and-drag input in a direction opposite to that of the first touch input described above. When the first touch input is the touch-and-drag input in the first direction toward the third display, the third touch input may be a touch-and-drag input in a second direction.

The first screen 11, which is output again on the first display 151a, may be output on a floating window 16 as shown in (b) in FIG. 12 and output overlapping with another screen that has been being output on the first display 151a. A virtual key performing a predetermined function may be output on the floating window. For example, a virtual key for performing functions such as sharing, image storage, and viewing in full screen may be output. The user may share the first screen 11 through a social media as shown in (c) in FIG. 12 using the virtual key, store a captured image of the first screen 11, and switch to the full screen.

Figure 13:
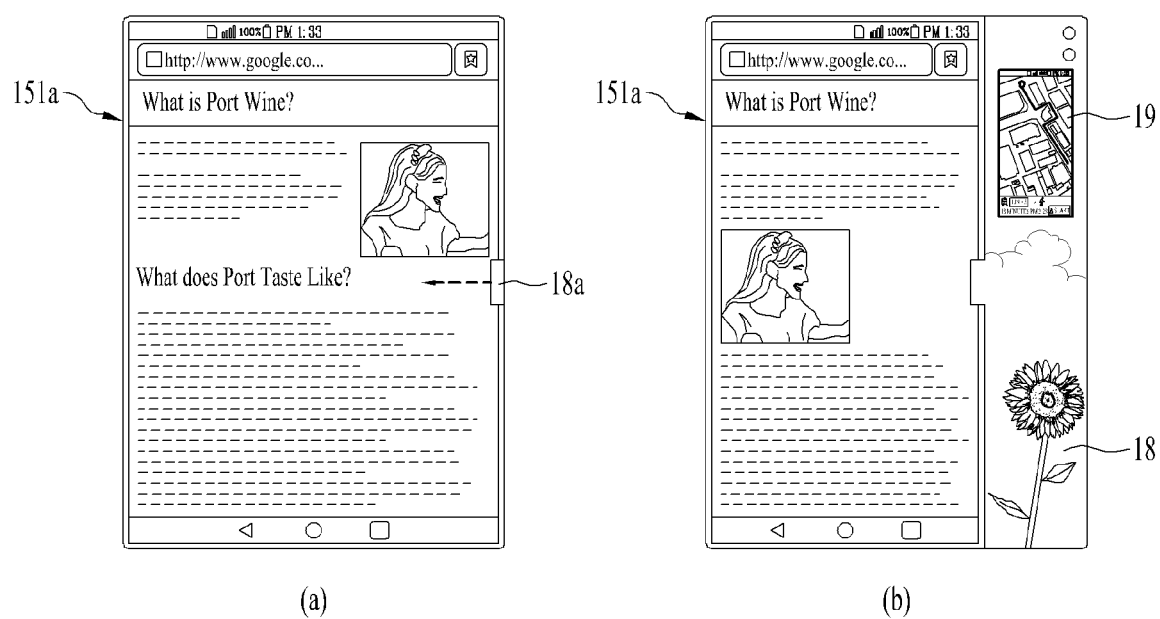
FIGS. 13 and 14 are views for illustrating utilization of an expanded portion when a first display of a mobile terminal in accordance with the present disclosure is expanded.
Figure 14:
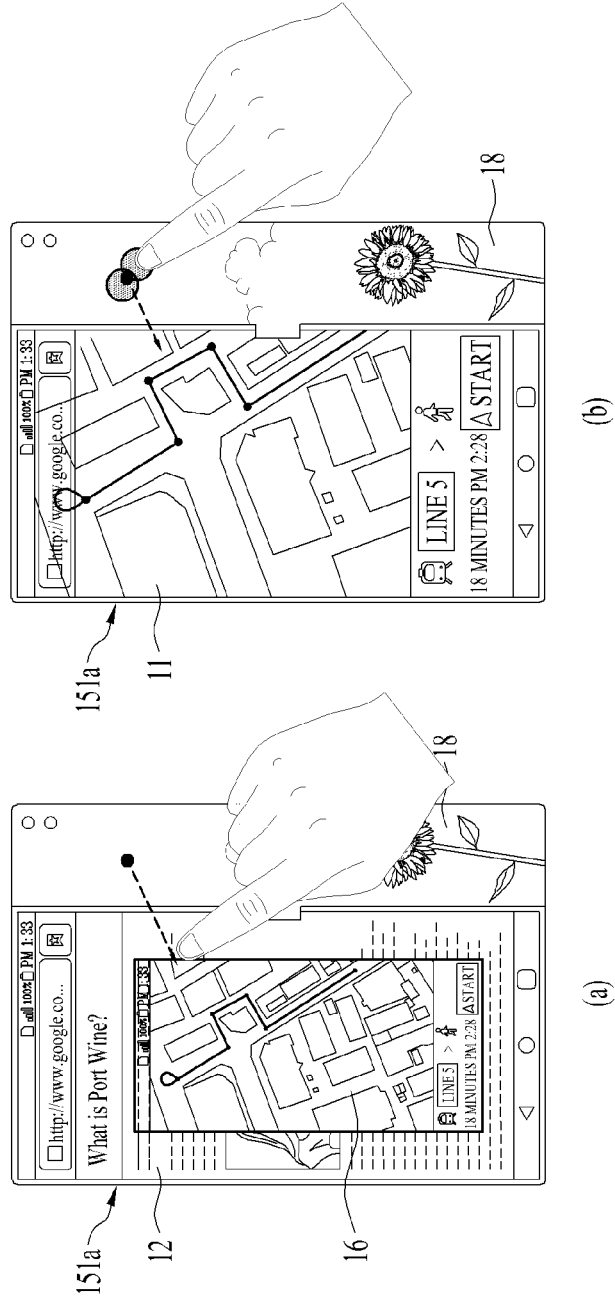

FIGS. 13 and 14 are views for illustrating utilization of an expanded portion when the first display 151a of the mobile terminal 100 in accordance with the present disclosure is expanded. An operation when the first display 151a is expanded and the second display 151b is reduced in the mobile terminal 100 expanding in the first direction as shown in FIGS. 3 to 6 will be described.

As shown in (a) in FIG. 13, when the second frame moves in the first direction and the first display 151a is expanded, the screen that has been being displayed on the first display 151a may be expanded or the screen may be rearranged. For example, the number of characters output for each line may increase, images may be rearranged, and the number of icons displayed on the screen may increase.

In this regard, a tab 18a may protrude from an end oriented in the first direction expanded as shown in (a) in FIG. 13. When the user drags the tab 18a, a wing screen 18 may be output as shown in (b) in FIG. 13. A thumbnail 19 or an icon corresponding to the saved first screen 11 may be output in the wing screen 18 to replace the reduced second display 151b. Alternatively, the wing screen 18 may be output directly in the expanded portion by omitting the operation of (a) in FIG. 13, and the icon or the like corresponding to the first screen 11 that has been being displayed on the second display 151b may be output.

As shown in FIG. 14, the user may output the first screen 11 on the first display 151a through a fourth touch input. Depending on a type of the fourth touch input, the first screen 11 may be output on the floating window 16 or may be output in the full screen in a region except for the wing screen 18. For example, when outputting the first screen 11 with the touch-and-drag input, the first screen 11 may be output on the floating window 16. When the icon corresponding to the first screen 11 is selected with a simple or double touch, the first screen 11 may be output in the large screen.

According to one embodiment of the present disclosure, it is possible to provide the mobile terminal 100 and a method for controlling the same capable of expanding the screen.

More specifically, the mobile terminal 100 may utilize the screens located on the front surface and the rear surface in an associated manner, thereby facilitating the multitasking.

The above description is merely illustrative of the technical idea of the present disclosure. A person with ordinary knowledge in the technical field to which the present disclosure belongs will be able to make various modifications and variations without departing from the essential characteristics of the present disclosure.

Therefore, the embodiments disclosed in the present disclosure are for illustrating rather than limiting the technical idea of the present disclosure, and the scope of the technical idea of the present disclosure is not limited by such embodiments.

The scope of protection of the present disclosure should be construed by the claims below, and all technical ideas within the scope equivalent thereto should be construed as being included in the scope of the present disclosure.

What is claimed is:

1. A mobile terminal comprising:
   a body;
   a flexible display unit having a first display positioned on a first surface of the body and a second display positioned on a second surface of the body opposite the first surface, the flexible display unit surrounding a side surface of the body,
   wherein the first display is configured to sense touch inputs;
   wherein the second display is configured to sense touch inputs;
   a gyro sensor for sensing a movement of the body; and
   a controller configured to control the first display and the second display based on the corresponding touch inputs,
   wherein the controller is further configured to:
   output a first screen image on the first display;
   remove the first screen image from the first display when a first touch input is sensed on the first display; and
   output the first screen image on the second display when the gyro sensor senses that positions of the first surface and the second surface of the body are reversed,
   wherein the first touch input includes a multi-touch-and-drag input where three touch points are dragged in a direction toward the side surface of the body surrounded by the flexible display unit.

2. The mobile terminal of claim 1, wherein the controller is further configured to deactivate the first display when outputting the first screen image on the second display.

3. The mobile terminal of claim 1, wherein the second display is further configured to:
   not sense a second touch input on the second display in a touch locked state; and
   sense the second touch input on the second display in a touch input state,
   wherein the controller is further configured to:
   not output a virtual key on the second display in the touch locked state; and
   switch a state of the second display to the touch input state and output the virtual key on the second display when an unlocking input is sensed.

4. The mobile terminal of claim 1, wherein the controller is further configured to output the first screen image again on the first display when a second touch input is sensed on the second display after removing the first screen image from the first display.

5. The mobile terminal of claim 1, wherein the controller is further configured to output the first screen image again on the first display when a second touch input is sensed on the first display after removing the first screen from the first display.

6. The mobile terminal of claim 5, wherein the controller is further configured to output the first screen image on a floating window superimposed on an existing screen image of the first display.

7. The mobile terminal of claim 1, wherein the body is configured to expand in a direction of the side surface thereof,
   wherein, in the flexible display unit, the first display is expanded and the second display is reduced when the body is expanded.

8. The mobile terminal of claim 7, wherein the controller is further configured to output an icon corresponding to the first screen image on an expanded portion when the first display is expanded.

9. A mobile terminal comprising:
   a body;
   a first display positioned on a first surface of the body, wherein the first display is configured to sense touch inputs;
   a second display positioned on a second surface of the body opposite the first surface, wherein the second display is configured to sense touch inputs;
   a gyro sensor for sensing a movement of the body; and
   a controller configured to control the first display and the second display based on the corresponding touch inputs,
   wherein the controller is further configured to:
   output a first screen image on the first display;
   remove the first screen image from the first display when a first touch input is sensed on the first display;
   after removing the first screen image from the first display:
     output a second screen image on the first display;
     remove the second screen image from the first display when the first touch input is again sensed on the first display; and
     output the first screen image and the second screen image on the second display to overlap each other when the gyro sensor senses that positions of the first surface and the second surface of the body are reversed.

10. A mobile terminal comprising:
    a body;
    a first display positioned on a first surface of the body, wherein the first display is configured to sense touch inputs;
    a second display positioned on a second surface of the body opposite the first surface, wherein the second display is configured to sense touch inputs;
    a gyro sensor for sensing a movement of the body; and
    a controller configured to control the first display and the second display based on the corresponding touch inputs,
    wherein the controller is further configured to:
    output a first screen image on the first display;
    remove the first screen image from the first display when a first touch input is sensed on the first display;
    after removing the first screen image from the first display:
      output a second screen image on the first display;
      remove the second screen image from the first display when the first touch input is again sensed on the first display; and
      output icons respectively corresponding to the first screen image and the second screen image on the second display when the gyro sensor senses that positions of the first surface and the second surface of the body are reversed;
    output the first screen image again on the first display when a second touch input is sensed on the first display after removing the first screen from the first display; and output the first screen image on a floating window superimposed on an existing screen image of the first display.

\* \* \* \* \*